(12) United States Patent
Lee et al.

(10) Patent No.: US 12,006,053 B2
(45) Date of Patent: Jun. 11, 2024

(54) HYBRID AIR MOBILITY VEHICLE

(71) Applicants: HYUNDAI MOTOR COMPANY, Seoul (KR); KIA CORPORATION, Seoul (KR)

(72) Inventors: Hee Kwang Lee, Suwon-si (KR); Hyun Seok Hong, Seoul (KR); Woo Suk Jung, Hwaseong-si (KR); Keun Seok Lee, Seongnam-si (KR); Hyun Woo Jun, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 364 days.

(21) Appl. No.: 17/317,066

(22) Filed: May 11, 2021

(65) Prior Publication Data
US 2022/0144443 A1 May 12, 2022

(30) Foreign Application Priority Data
Nov. 6, 2020 (KR) .......................... 10-2020-0147730

(51) Int. Cl.
| | | |
|---|---|---|
| B64D 31/06 | (2006.01) | |
| B60L 50/61 | (2019.01) | |
| B60L 58/12 | (2019.01) | |
| B64D 27/02 | (2006.01) | |
| B64D 27/24 | (2006.01) | |
| B64D 41/00 | (2006.01) | |

(52) U.S. Cl.
CPC ............. *B64D 31/06* (2013.01); *B60L 50/61* (2019.02); *B60L 58/12* (2019.02); *B64D 27/02* (2013.01); *B64D 27/24* (2013.01); *B64D 41/00* (2013.01); *B60L 2200/10* (2013.01); *B64D 27/026* (2024.01)

(58) Field of Classification Search
None
See application file for complete search history.

(56) References Cited

U.S. PATENT DOCUMENTS

| | | | | |
|---|---|---|---|---|
| 10,737,797 | B2* | 8/2020 | Murrow | .................. B64D 27/24 |
| 2019/0340933 | A1* | 11/2019 | Villa | ..................... G06Q 10/047 |
| 2020/0056546 | A1* | 2/2020 | Terwilliger | ............... F02C 9/54 |
| 2022/0042465 | A1* | 2/2022 | Swann | ...................... F02C 9/00 |
| 2022/0055743 | A1* | 2/2022 | Kamio | ................... B64C 27/08 |

FOREIGN PATENT DOCUMENTS

KR    10-2017-0140972 A    12/2017

* cited by examiner

*Primary Examiner* — Jason H Duger
(74) *Attorney, Agent, or Firm* — Lempia Summerfield Katz LLC (57) ABSTRACT

A hybrid air mobility vehicle can make a long-distance flight through an efficient operation of an engine and a battery, and can reduce discomfort by reducing noise according to flight surroundings. The hybrid air mobility vehicle includes: an engine and a generator; a battery and a drive motor electrically connected to the generator; a first propeller connected to the drive motor and a second propeller connected to the generator through a clutch; and a controller that controls driving of the engine, the clutch, and the drive motor, based on a flight factor including at least one of a flight mode, a required power, a battery charging amount, or a surrounding flight environment of the hybrid air mobility vehicle.

18 Claims, 8 Drawing Sheets

<Reference Table>

| Ref. No. | 1 | 2 | 3 | 5 | 6 | 7 |
|---|---|---|---|---|---|---|
| Name | Engine | Generator | Battery | First Propeller | Second Propeller | Clutch |

HYBRID AIR MOBILITY VEHICLE

CROSS REFERENCE TO RELATED APPLICATION

This application claims priority to and the benefit of Korean Patent Application No. 10-2020-0147730, filed on Nov. 6, 2020, the entire contents of which are incorporated herein by reference.

FIELD

The present disclosure relates to a hybrid air mobility vehicle which increases flight efficiency by improving electric energy efficiency of a battery.

BACKGROUND

The statements in this section merely provide background information related to the present disclosure and may not constitute prior art.

Recently, an air mobility vehicle is under development to be used in various aspects, such as cargo container, medical transport, and the like. In addition, the air mobility vehicle implementing energy efficiency and stabilization of flight mobility have been developed and commercialized.

Such an air mobility vehicle makes a flight through driving of propellers, but only a battery is used to be charged with an electric energy for the driving of the propellers to cause restrictions to arise. That is, for a long flight of the air mobility vehicle, a hybrid system adopting an internal combustion engine and a battery is applied. Such a hybrid system drives the propellers by the electric energy of the battery and supplements the insufficient electric energy in a manner that the internal combustion engine generates electricity.

However, since the internal combustion engine has the problem in that loud noise is generated when the engine operates, and the air mobility vehicle should make a flight even in downtown areas, people around may feel discomfort due to the noise.

The foregoing is intended merely to aid in the understanding of the background of the present disclosure, and is not intended to mean that the present disclosure falls within the purview of the related art that is already known to those of ordinary skill in the art.

SUMMARY

The present disclosure provides a hybrid air mobility vehicle, which enables a long-distance flight through an efficient driving of an internal combustion engine and a battery, and which reduces discomfort caused by noise through reduction of the noise according to flight surroundings.

According to one form of the present disclosure, a hybrid air mobility vehicle includes: an engine and a generator; a battery and a drive motor electrically connected to the generator; a first propeller connected to the drive motor and a second propeller connected to the generator through a clutch; and a controller configured to control driving of the engine, the clutch, and the drive motor and to control the driving based on a flight factor including one or more of a flight mode, a required power, a battery charging amount, or a surrounding flight environment of the hybrid air mobility vehicle.

In the controller, the flight mode includes hovering, cruising, or taxing, the required power is determined according to a flight speed required during the hovering or the cruising, and the surrounding flight environment includes a population density of a flight area where the hybrid air mobility vehicle is flying, whether a safe zone exists in the flight area, existence/nonexistence of noise blocking facility, and a flight altitude of the hybrid air mobility vehicle.

In case that the flight mode is the hovering and the battery charging amount is in a maximum charging state, the controller is configured to operate the first propeller by driving the drive motor with a power of the battery.

In case that the flight mode is the hovering and the battery charging amount is equal to or larger than a set capacity, the controller is configured to operate the first propeller by driving the drive motor with a power of the battery and a power generated by the generator through driving the engine.

In case that the population density of the flight area is equal to or higher than a reference population and the flight altitude is equal to or lower than a set altitude, the controller is configured to operate the first propeller by driving the drive motor with the power of the battery.

In case that the noise blocking facility exists in the flight area, the controller is configured to operate the first propeller by driving the drive motor with the power of the battery and the power generated by the generator through driving the engine.

In case that the flight area is the safe zone, the controller is configured to operate the first propeller by driving the drive motor with the power of the battery and the power generated by the generator through driving the engine.

In case that the flight mode is the hovering and the battery charging amount is smaller than a set capacity, the controller is configured to charge the battery with a power generated by the generator through an engine drive and to drive the drive motor.

In case that the flight mode is transitioning from the hovering to the cruising and the battery charging amount is in a maximum charging state, the controller is configured to operate the first propeller and the second propeller with a power of the battery. In particular, the drive motor drives the first propeller, and the generator drives the second propeller via the clutch that connects the generator to the second propeller.

The controller is configured to determine whether to save the battery according to the battery charging amount, to operate the first propeller by driving the drive motor with the power of the battery and to operate the second propeller with a power by engine driving through tooth-engagement of the clutch in case that the battery saving is required.

The controller is configured to subdivide the battery saving according to the battery charging amount, and to drive the driving motor or to charge the battery with the power generated by the generator by increasing an output according to the engine driving as the battery charging amount is decreased. In one form, when the controller determines to save the battery, the controller controls the engine to increase the power generated through the generator in proportion to a level of the battery charging amount such that the power generated by the engine through the generator increases as the battery charging amount decreases.

In case that the flight mode is the cruising and the battery charging amount is equal to or larger than a set capacity, the controller is configured to operate the second propeller by tooth-engaging the clutch and driving the generator with a power of the battery.

In case that the flight mode is the cruising, the battery-charging amount is equal to or larger than a set capacity, and the flight speed is equal to or higher than a high driving speed, the controller is configured to operate the second propeller with a power of the battery and a power by engine driving by tooth-engaging the clutch and driving the engine.

The controller is configured to determine whether to save the battery according to the battery charging amount, to operate the second propeller with the power by the engine driving by tooth-engaging the clutch and driving the engine in case that the battery saving is required.

In case that the population density is equal to or higher than a reference population or the flight altitude is equal to or lower than a set altitude, the controller is configured to operate the second propeller by tooth-engaging the clutch and driving the generator with the power of the battery. In one form, the controller controls the clutch to mechanically connect the second propeller to the generator driven with the power of the battery so as to operate the second propeller.

In case that the flight mode is the cruising, the battery charging amount is smaller than the set capacity, or in an emergency landing situation, the controller is configured to operate the second propeller by tooth-engaging the clutch and to charge the battery with a power generated by the generator by increasing an output according to engine driving.

In case that the flight mode is the taxing, the controller is configured to operate the second propeller by tooth-engaging the clutch and driving the generator with a power of the battery.

In case that the flight mode is the taxing and the battery charging amount is smaller than a set capacity, the controller is configured to operate the second propeller with a power by engine driving by driving the engine.

A plurality of first propellers are provided on a wing of a flight body to generate a thrust in upward and downward directions during takeoff and landing of the flight body, and the second propeller is provided on a wing or at a tail of the flight body to generate a thrust rearward during flight of the flight body.

The hybrid air mobility vehicle composed of the above-described structure enables a long-distance flight through an efficient driving of an engine and a battery, and reduces discomfort caused by noise through reduction of the noise according to flight surroundings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a hybrid air mobility vehicle according to an exemplary forms of the present disclosure will be described with reference to the accompanying drawings.

Figure 1:
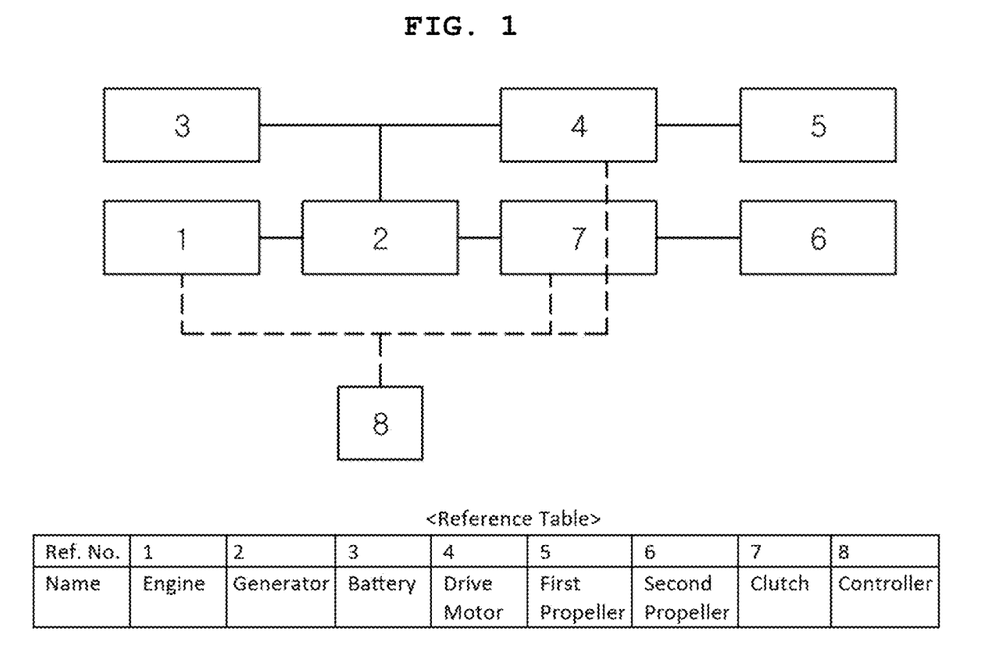
FIG. 1 is a configuration diagram of a hybrid air mobility vehicle according to one form of the present disclosure.
Figure 2:
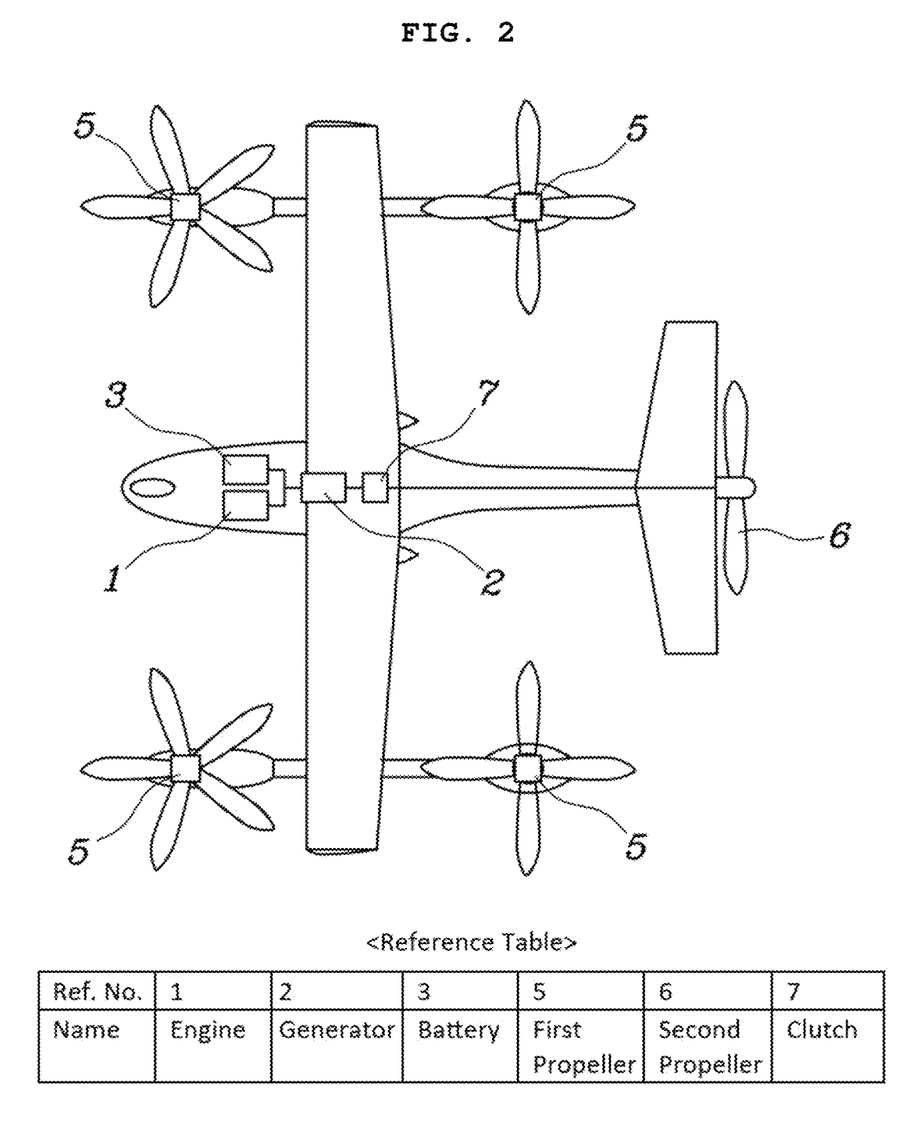
FIG. 2 is a diagram showing the hybrid air mobility vehicle illustrated in FIG. 1.
Figure 3:
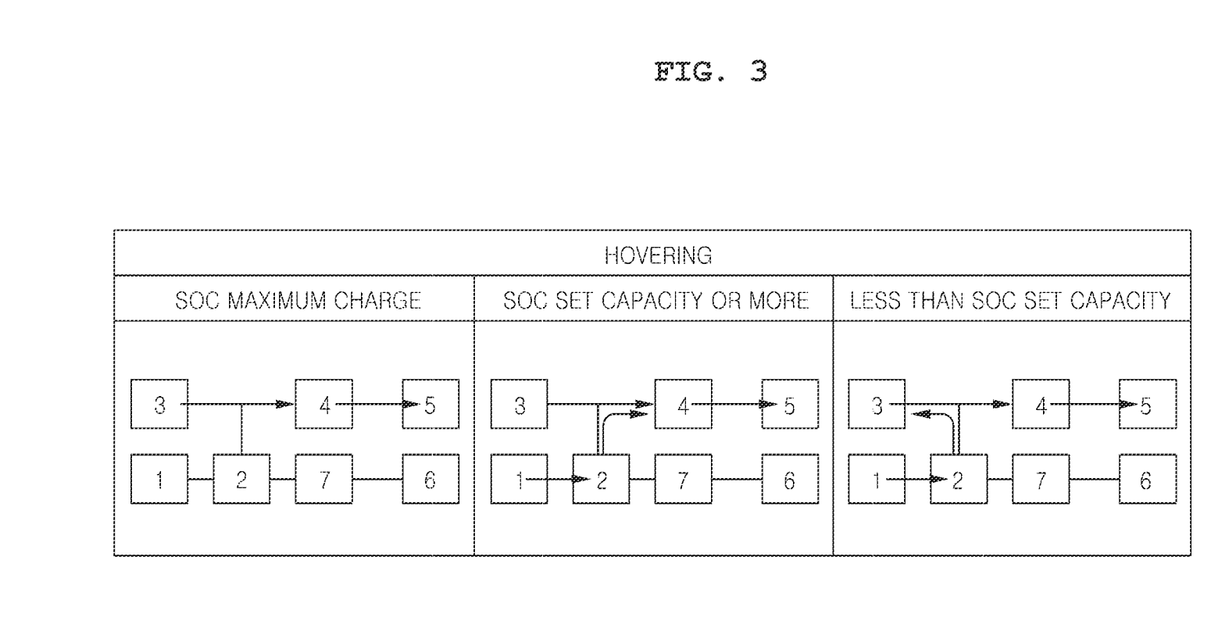
FIGS. 3 and 4 are diagrams explaining a hovering control of the hybrid air mobility vehicle illustrated in FIG. 1.
Figure 4:
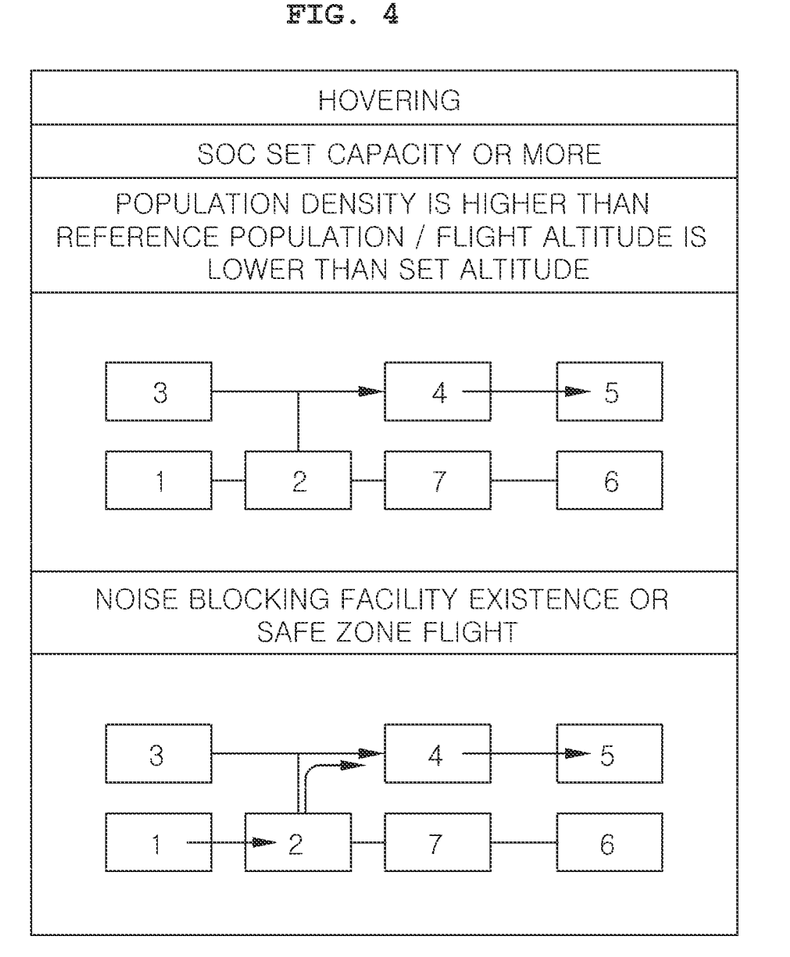
Figure 5:
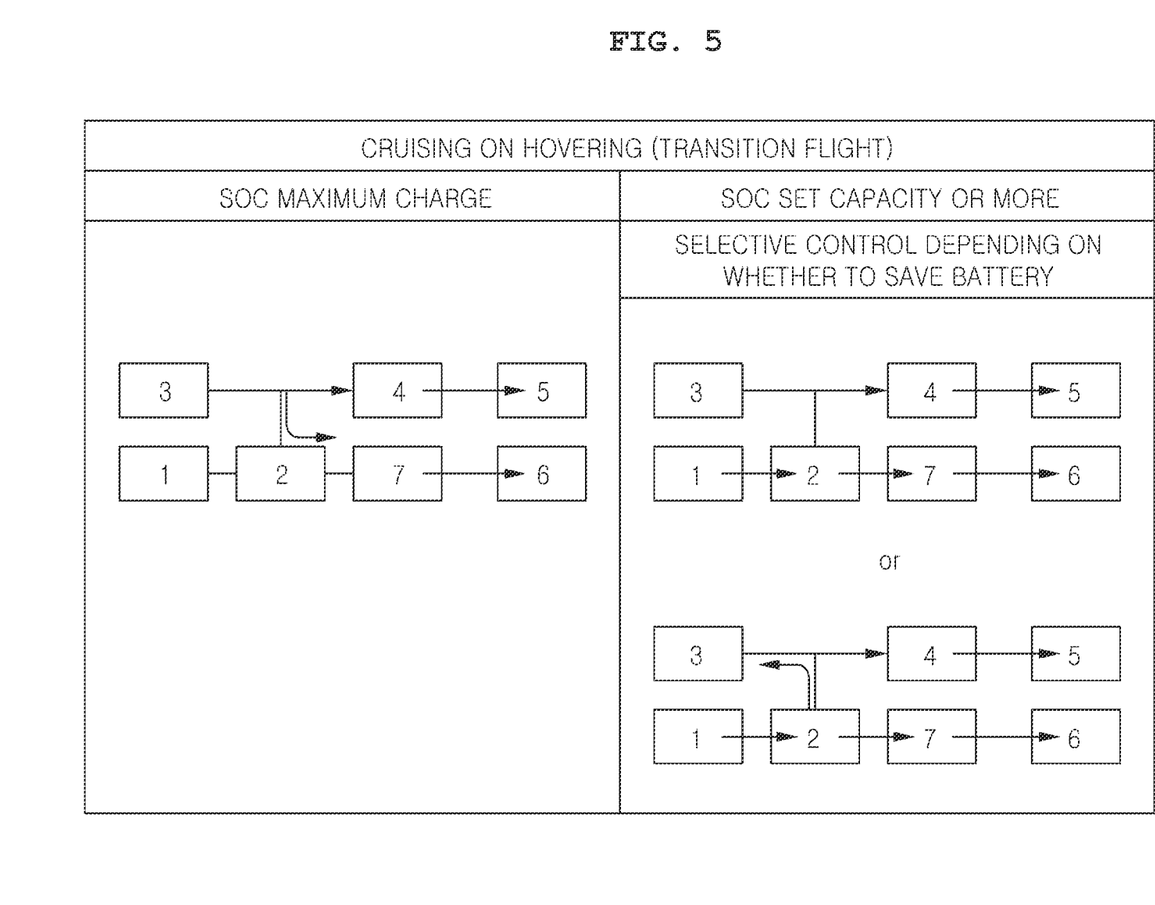
FIG. 5 is a diagram explaining a control during cruising on hovering of the hybrid air mobility vehicle illustrated in FIG. 1.
Figure 6:
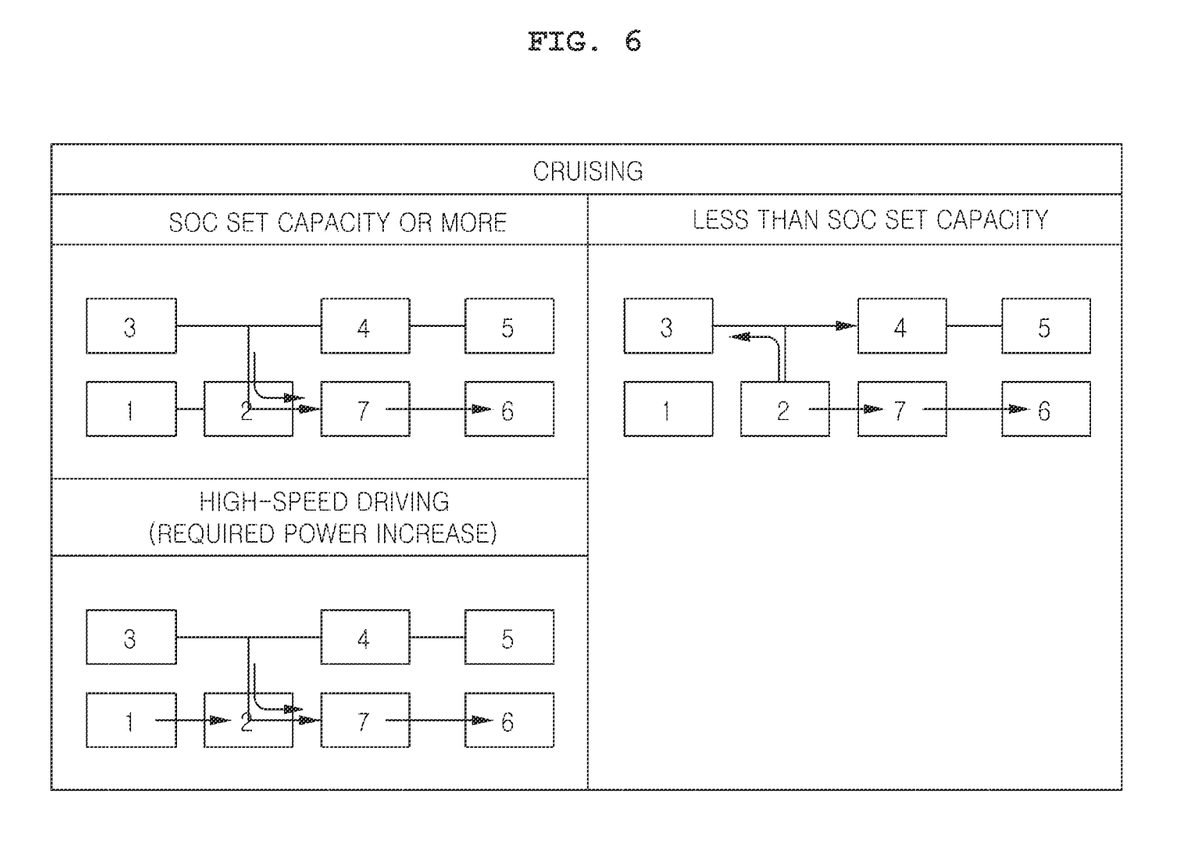
FIGS. 6 and 7 are diagrams explaining a cruising control of the hybrid air mobility vehicle illustrated in FIG. 1.
Figure 7:
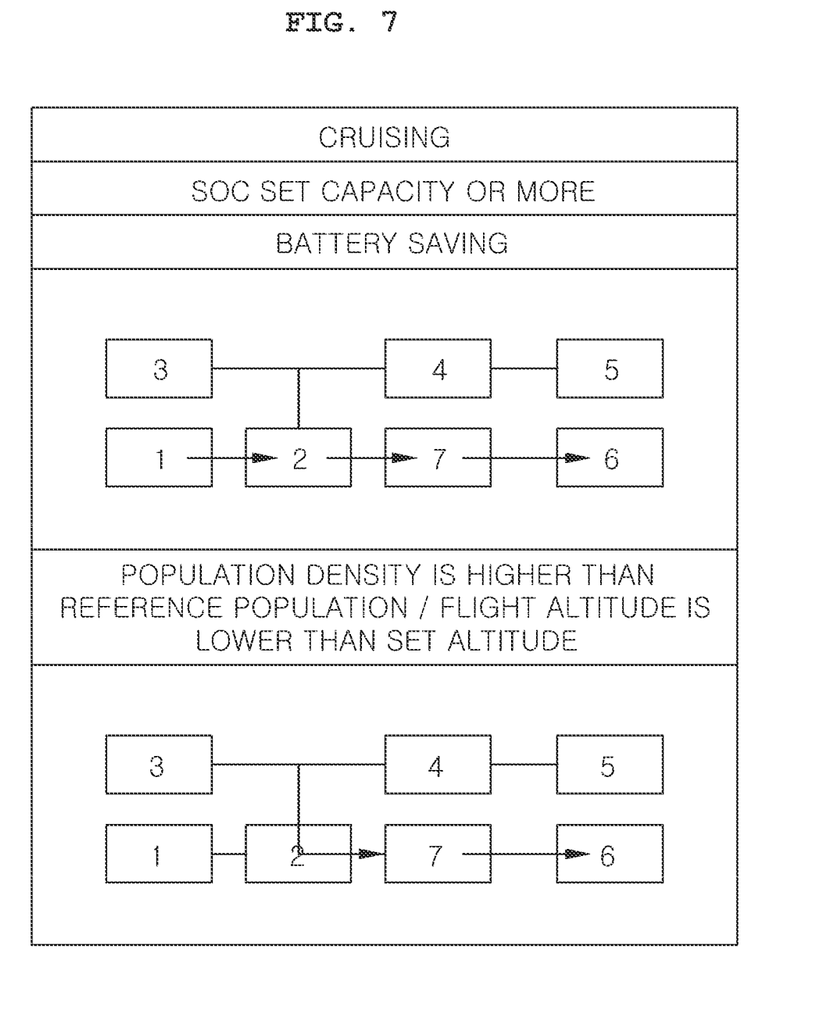
Figure 8:
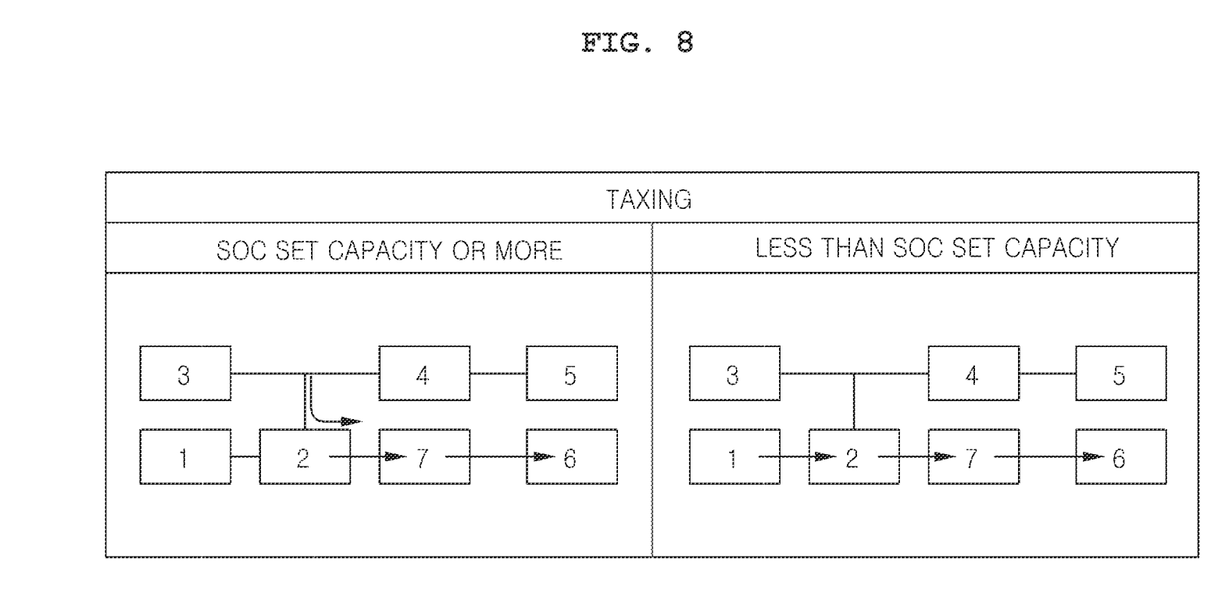
FIG. 8 is a diagram explaining a taxing control of the hybrid air mobility vehicle illustrated in FIG. 1.

FIG. 1 is a configuration diagram of a hybrid air mobility vehicle according to one form of the present disclosure, FIG. 2 is a diagram showing the hybrid air mobility vehicle illustrated in FIG. 1, FIGS. 3 and 4 are diagrams explaining a hovering control of the hybrid air mobility vehicle illustrated in FIG. 1, FIG. 5 is a diagram explaining a control during cruising on hovering of the hybrid air mobility vehicle illustrated in FIG. 1, FIGS. 6 and 7 are diagrams explaining a cruising control of the hybrid air mobility vehicle illustrated in FIG. 1, and FIG. 8 is a diagram explaining a taxing control of the hybrid air mobility vehicle illustrated in FIG. 1.

As illustrated in FIG. 1, a hybrid air mobility vehicle in one form of the present disclosure includes: an engine 1 and a generator 2, a battery 3 and a drive motor 4 electrically connected to the generator 2, a first propeller 5 connected to the drive motor 4 and a second propeller 6 connected to the generator 2 through a clutch 7, and a controller 8 configured to control driving of the engine 1, the clutch 7, and the drive motor 4 and to control the driving based on a flight factor including one or more of a flight mode, a required power, a battery charging amount, or a surrounding flight environment.

Here, the engine 1 is an internal combustion engine that generates a power by burning a fuel, and the battery 3 stores electric energy therein.

The generator 2 receives the power generated and transferred from the engine 1 and generates the power, or is driven by the power transferred from the battery 3 and operates the second propeller 6 by generating a rotation power. In particular, the generator 2 is connected to the second propeller 6 via the clutch 7, and selectively transfers the rotation power of the generator 2 to the second propeller 6 depending on whether the clutch 7 is tooth-engaged.

The drive motor 4 is supplied with the power from the battery 3 or the power generated and transferred from the generator 2, and operates the first propeller 5.

The configuration of the engine 1, the generator 2, the battery 3, the clutch 7, and the controller 8 as described above is provided in a flight body, and the first propeller 5 and the second propeller 6 are installed outside the flight body to generate a thrust. Here, as for the first propeller 5 and the second propeller 6, as illustrated in FIG. 2, a plurality of first propellers 5 are provided on the wing of the flight body to generate the thrust in upward and downward directions during takeoff and landing of the flight body, and the second propeller 6 is provided on the wing or at the tail of the flight body to generate the thrust rearward during the flight of the flight body.

That is, as shown in FIG. 2, the flight body is provided with the wing for generating a lift force during flight, and a plurality of first propellers 5 are provided on the wing to generate the thrust in upward and downward directions. The first propellers 5 are driven during the takeoff and landing of the flight body, and generate the thrust whereby the flight body moves upward. Meanwhile, the second propeller 6 is provided on the wing or at the tail of the flight body, and generates the thrust rearward so that the flight body moves forward. The second propeller 6 as described above may be applied at the tail of the flight body, and may enable the flight body to fly forward.

Through this, the flight body according to the present disclosure is of a hybrid type using the power of the battery 3 or the power according to the driving of the engine 1, and can make a flight through the driving of the first propellers 5 and the second propeller 6.

In particular, the controller 8 controls the driving of the engine 1, the clutch 7, and the drive motor 4, and controls the driving based on a flight factor including one or mere of a flight mode, a required power, a battery charging amount, or a surrounding flight environment. As described above, the controller 8 controls the driving of the engine 1, the clutch 7, and the driving motor 4 based on various flight factors, and thus an optimized flight can be made according to respective situations.

In one form, the controller 8 may implement the flight mode includes hovering, cruising, or taxing, and the required power is determined according to a flight speed required during the hovering or the cruising. Here, the hovering corresponds to a case that the flight body moves in upward and downward directions or makes a hovering flight, the cruising corresponds to a case that the flight body makes a flight in forward and backward directions toward a specific position, and the taxing corresponds to a case that the flight body moves in a state where the flight body lands on the ground. Further, the controller 8 determines whether to use the power of the battery 3 or the power of the engine 1 through determination of the required power according to the flight speed.

Meanwhile, the surrounding flight environment includes a population density of a flight area, whether a safe zone exists in the flight area, existence/nonexistence of noise blocking facility, and a flight altitude. Such surrounding flight environment information can be collected through satellite information. As described above, the controller 8 controls the noise generated from the flight of the flight body to be reduced according to the surrounding situation based on the collected information such as the population density of the flight area, existence/nonexistence of the safe zone in the flight area, existence/nonexistence of the noise blocking facility, and the flight altitude.

Based on this, the controller 8 efficiently distributes and uses the power of the battery and the power of the engine 1 in consideration of the flight node, the battery charging amount, and the surrounding flight environment.

More specifically, as illustrated in FIG. 3, in case that the flight mode is the hovering and the battery charging amount is in the maximum charging state, the controller 8 operates the first propeller 5 by driving the drive motor 4 with the power of the battery 3. As described above, during the hovering of the flight body, the battery charging amount is in the maximum charging state, and if the drive motor 4 is driven only by the power of the battery 3, the flight noise is reduced. That is, the drive motor 4 generates a very small driving noise during the operation thereof, and thus discomfort caused by the flight noise does not occur during the hovering of the flight body. However, the flight body uses a large power during the hovering, and the first propeller 5 is operated by driving the drive motor 4 only by the power of the battery 3 in a state that the battery charging amount is in the maximum charging state. Here, the maximum charging state of the battery charging amount may be set so that the residual quantity is equal to or larger than 90%.

Meanwhile, in case that the flight mode is the hovering and the battery charging amount is equal to or larger than a set capacity, the controller 8 operates the first propeller 5 by driving the drive motor 4 with the power generated by the generator 2 through driving of the engine 1 and the power of the battery 3. As described above, if the battery charging amount is equal to or larger than the set capacity during the hovering of the flight body, the generator 2 generates the power by the power according to the driving of the engine 1, and the drive motor 4 is driven by the power of the battery 3 together with the corresponding power, thereby reducing the consumption of electric energy stored in the battery 3. Here, the set capacity of the battery charging amount may be set so that the residual quantity is equal to or larger than 20%. That is, during the hovering of the flight body, a large power is used, and if the driving motor A is driven only by the power of the battery 3 in a state that some of the battery charging amount is consumed, the power stored in the battery 3 may be under overconsumption. Accordingly, if the battery charging amount is equal to or larger than the set capacity in the hovering state, the controller 8 operates the first propeller 5 by driving the drive motor 4 with the power generated from the generator 2 and the power of the battery 3.

Meanwhile, as illustrated in FIG. 4, in case that the population density of the flight area is equal to or higher than a reference population and the flight altitude is equal to or lower than a set altitude, the controller 8 operates the first propeller 5 by driving the drive motor 4 with the power of the battery 3. That is, if the population density is equal to or higher than the reference population, discomfort may be created against the flight noise in the corresponding residence. In particular, if the flight altitude of the flight body is low, a louder flight noise is transferred in the surroundings. Accordingly, if the population density of the flight area is equal to or higher than the reference population and the flight altitude is equal to or lower than the set altitude, the controller 8 drives the drive motor 4 with the power of the battery 3 to reduce the flight noise. Here, if the flight altitude is equal to or higher than the set altitude, the controller 8 operates the first propeller 5 by driving the drive motor 4 with the power generated from the generator 2 through the driving of the engine 1 and the power of the battery 3.

Meanwhile, in case that the noise blocking facility exists in the flight area, the controller 8 operates the first propeller 5 by driving the drive motor 4 with the power generated by the generator 2 through the driving of the engine 1 and the power of the battery 3. Here, the noise blocking facility may be a vertiport, and if the noise blocking facility exists although the population density is equal to or higher than the reference population, the noise blocking facility blocks the noise in the surroundings, and thus the problem of noise occurrence can be solved.

Further, in case that the flight area is the safe zone, the controller 8 operates the first propeller 5 by driving the drive motor 4 with the power generated by the generator 2 through the driving of the engine 1 and the power of the battery 3.

Here, the safe zone may be an area in which the problem of the noise occurrence does not occur, such as a non-resident area or an airport.

As described above, if the noise blocking facility exists in the flight area or the flight area is the safe zone, the controller 8 drives the drive motor 4 with the power generated by the generator 2 through the driving of the engine 1 and the power of the battery 3, and thus the power consumption of the battery 3 can be reduced.

As described above, during the hovering flight, the use efficiency of the electric energy of the battery 3 is improved through a selective use of the driving of the engine 1 or the power of the battery 3 according to the battery charging amount, and the discomfort caused by the flight noise in the surroundings can be solved by selectively using the driving of the engine 1 in consideration of the surrounding flight environment.

Meanwhile, in case that the flight mode is the hovering and the battery charging amount is smaller than the set capacity, the controller 8 charges the battery 3 with the power generated by the generator 2 through the driving of the engine 1, and drives the drive motor 4. As described above, if the battery charging amount is smaller than the set capacity, an abnormality occurs not only in controlling the propellers according to the flight but also in controlling the primary power, and in this case, the controller 8 charges the battery 3 with the power generated by the generator 2 through the driving of the engine 1, and drives the drive motor 4 at the same time. For this, the controller 8 may control to increase the output according to the driving of the engine 1 and to operate the first propellers 5 with the power generated by the generator 2 through the driving of the engine 1, thereby securing the flight stability.

Hereinafter, a control according to cruising on hovering in a state that the flight body enters a predetermined altitude will be described.

As illustrated in FIG. 5, in case that the flight mode is the cruising on the hovering and the battery charging amount is in the maximum charging state, the controller 8 operates the first propellers 5 and the second propeller by driving the drive motor 4 and the generator 2 with the power of the battery 3 and tooth-engaging the clutch 7. That is, since the flight body makes a transition flight by the cruising on the hovering, the controller 8 operates the first propellers 5 and the second propeller 6 together. For this, the controller 8 transfers the rotation power of the generator 2 to the second propeller 6 by tooth-engaging the clutch 7.

Further, if the battery charging amount is in the maximum charging state, the controller 8 drives the drive motor 4 only with the power of the battery 3 to reduce the flight noise. Such a control of the controller 8 may be performed even in a state that the operation of the engine 1 is impossible.

Meanwhile, the controller 8 determines whether to save the battery according to the battery charging amount. In this case, the battery charging amount may be equal to or larger than the set capacity. Here, the controller 8 may determine whether to save the battery by deriving the power consumption of the battery 3 through the flight distance of the flight body and the residual quantity of the battery charging amount, which are elements to determine whether to perform the battery saving. As described above, if the battery saving is desired, the controller 8 operates the first propellers 5 by driving the drive motor 4 with the power of the battery 3, and operates the second propeller 6 with the power by the driving of the engine 1 by tooth-engaging the clutch 7. That is, in case of transition from the hovering to the cruising, both the first propellers 5 and the second propeller 6 should be driven. In this case, the first propellers 5 are driven by the drive motor 4 to which the power of the battery 3 is transferred, and the second propeller 6 is driven by the transferred power according to the driving of the engine 1, thereby reducing the power consumption of the battery 3.

In addition, the controller 8 subdivides the battery saving according to the battery charging amount, and drives the driving motor 4 or charges the battery 3 with the power generated by the generator 2 by increasing the output according to the driving of the engine 1 as the battery charging amount is decreased. As described above, as the battery charging amount is decreased, the controller 8 drives the second propeller 6 and charges the battery 3 as well by increasing the output according to the driving of the engine 1. Accordingly, even if the battery 3 consumes the power according to the operation of the first propellers 5, the power is charged through the engine 1 and the generator 2, and thus the power consumption of the battery 3 is reduced.

As described above, during the transition flight from the hovering to the cruising, the controller 8 operates the first propellers 5 and the second propeller 6, and performs the battery saving control according to the battery charging amount, and thus the power consumption of the battery 3 is reduced to make the long-distance flight possible.

Hereinafter, a control according to the cruising of the flight body will be described.

As illustrated in FIG. 6, in case that the flight mode is the cruising and the battery charging amount is equal to or larger than the set capacity, the controller 8 operates the second propeller 6 by tooth-engaging the clutch 7 and driving the generator 2 with the power of the battery 3. As described above, if the battery charging amount is equal to or larger than the set capacity during the cruising of the flight body, the second propeller 6 is operated through the generator 2 only with the power of the battery 3 to reduce the flight noise. That is, since a very small driving noise occurs by the rotation of the second propeller 6 through the generator 2 with the power of the battery 3, the passenger's discomfort caused by the flight noise during the cruising flight is reduced. Further, since the flight body can make a flight by the lift, the operation amount of the second propeller 6 is decreased as compared with the hovering. Accordingly, if the battery charging amount is equal to or larger than the set capacity during the cruising flight, the controller 8 operates the second propeller 6 with the power of the battery 3.

Meanwhile, in case that the flight mode is the cruising, the battery charging amount is equal to or larger than the set capacity, and the flight speed is equal to or higher than the high driving speed, the controller 8 operates the second propeller 6 with the power of the battery 3 and the power by the driving of the engine 1 by tooth-engaging the clutch 7 and driving the engine 1. Here, the high driving speed may be determined according to the power consumption of the battery 3 according to the flight speed. If the flight body performs the high-speed driving in the state that the flight mode is in the cruising state, the required power is increased, and in this case, if the second propeller 6 is operated only with the power of the battery 3, the power consumption of the battery 3 is accelerated. Accordingly, in case that the flight body makes the flight over the high driving speed, the controller 8 operates the second propeller 6 with the power of the battery 3 together with the power by the driving of the engine 1, and thus the power consumption of the battery 3 is reduced.

Here, as illustrated in FIG. 7, the controller 8 determines whether to save the battery according to the battery charging amount, and operates the second propeller 6 with the power by the driving of the engine 1 by tooth-engaging the clutch 7 and driving the engine 1 in case that the battery saving is desired. The controller 8 may determine whether to save the battery by deriving the power consumption of the battery 3 through the flight distance of the flight body and the residual quantity of the battery charging amount, which are elements to determine whether to perform the battery saving. As described above, if the battery saving is desired in the cruising flight state, the controller 8 operates the second propeller 6 with the power by driving the engine 1. Through this, the second propeller 6 is driven by the transferred power by the driving of the engine 1, and since the power of the battery 3 is not used, the flight distance through the battery 3 can be secured thereafter.

Meanwhile, in case that the population density is equal to or higher than the reference population or the flight altitude is equal to or lower than the set altitude, the controller 6 operates the second propeller 6 by tooth-engaging the clutch 7 and driving the generator 2 with the power of the battery 3. As described above, if the population density of the flight area is equal to or higher than the reference population and the flight altitude is equal to or lower than the set altitude, the controller 8 may control to reduce the flight noise through the operation of the second propeller 6 according to the driving of the generator 2 with the power of the battery 3. Through this, the surrounding noise damage according to the flight of the flight body can be prevented from occurring.

Meanwhile, in case that the flight mode is the cruising, the battery charging amount is smaller than the set capacity, or in an emergency landing situation, the controller 8 operates the second propeller 6 by tooth-engaging the clutch 7 and charges the battery 3 with the power generated by the generator 2 by increasing the output according to the driving of the engine 1. Here, the emergency landing situation is a situation of an engine trouble, part failure, and flight accident. As described above, if the battery charging amount is smaller than the set capacity, or in the emergency landing situation, an abnormality may occur not only in controlling the propellers according to the flight but also in controlling the primary power, and in this case, the controller 8 charges the battery 3 with the power generated by the generator 2 through the driving of the engine 1, and operates the second propeller 6 at the same time. In this case, the controller 8 controls to increase the output according to the driving of the engine 1 and to smoothly perform the power charging of the battery 3 and the operation of the second propeller 6 through the driving of the engine 1.

Meanwhile, as illustrated in FIG. 8, in case that the flight mode is the taxing, the controller 8 operates the second propeller 6 by tooth-engaging the clutch 7 and driving the generator 2 with the power of the battery 3. That is, if the flight mode is the taxing, the flight body operates on the ground, and by operating the second propeller 6 through the generator 2 with the power of the battery 3, the flight noise can be reduced. If the flight body is provided with landing wheels, the taxing may be performed through the landing wheels, and if movement by the landing wheels is impossible or an additional power is desired, the flight body can be moved through the operation of the second propeller 6.

Meanwhile, in case that the flight mode is the taxing and the battery charging amount is smaller than the set capacity, the controller 8 drives the engine 1 and operates the second propeller 6 with the power by the driving of the engine 1. Through this, even if the battery charging amount is smaller than the set capacity, the flight body can move through the operation of the second propeller 6 with the power by the driving of the engine 1, and in addition to the control of the second propeller 6 that is desired for movement, the power is supplied to the primary power supply, and thus a stable operation can be performed.

The hybrid air mobility vehicle composed of the above-described structure enables the long-distance flight through the efficient driving of the engine 1 and the battery 3, and reduces the discomfort caused by the noise through reduction of the noise according to flight surroundings.

Although the specific forms of the present disclosure have been illustrated and described for illustrative purposes, those of ordinary skill in the art will appreciate that various modifications, additions and substitutions are possible, without departing from the technical idea of the present disclosure.

What is claimed is:

1. A hybrid air mobility vehicle comprising:
   an engine and a generator;
   a battery and a drive motor electrically connected to the generator;
   a first propeller connected to the drive motor and a second propeller connected to the generator through a clutch; and
   a controller configured to:
   control driving of the engine, the clutch, and the drive motor, based on a flight factor including at least one of a flight mode, a required power, a battery charging amount, or a surrounding flight environment of the hybrid air mobility vehicle,
   wherein the flight mode includes hovering, cruising and taxing, and the required power required during the hovering or the cruising is determined based on a flight speed of the hybrid air mobility vehicle, and
   wherein when the flight mode is transitioning from the hovering to the cruising and the controller determines to save the battery based on the battery charging amount, the controller is configured to:
   operate the first propeller by driving the drive motor with a power of the battery, and
   operate the second propeller with a power generated from the engine being engaged with the generator via the clutch.

2. The hybrid air mobility vehicle according to claim 1, wherein:
   the surrounding flight environment includes: a population density of a flight area where the hybrid air mobility vehicle is flying, whether a safe zone exists in the flight area, an existence of a noise blocking facility, and a flight altitude of the hybrid air mobility vehicle.

3. The hybrid air mobility vehicle according to claim 2, wherein when the flight mode is the hovering and the battery charging amount is in a maximum charging state, the controller is configured to operate the first propeller by driving the drive motor with a power of the battery.

4. The hybrid air mobility vehicle according to claim 2, wherein when the flight mode is the hovering and the battery charging amount is equal to or larger than a set capacity, the controller is configured to operate the first propeller by driving the drive motor with a power of the battery and a power generated by the generator through driving the engine.

5. The hybrid air mobility vehicle according to claim 2, wherein when the population density of the flight area is equal to or higher than a reference population and the flight altitude is equal to or lower than a set altitude, the controller is configured to operate the first propeller by driving the drive motor with the power of the battery.

6. The hybrid air mobility vehicle according to claim 2, wherein when the noise blocking facility exists in the flight area, the controller is configured to operate the first propeller by driving the drive motor with the power of the battery and the power generated by the generator through driving the engine.

7. The hybrid air mobility vehicle according to claim 2, wherein when the flight area is the safe zone, the controller is configured to operate the first propeller by driving the drive motor with the power of the battery and the power generated by the generator through driving the engine.

8. The hybrid air mobility vehicle according to claim 2, wherein when the flight mode is the hovering and the battery charging amount is smaller than a set capacity, the controller is configured to: charge the battery with a power generated by the generator through driving the engine, and drive the drive motor.

9. The hybrid air mobility vehicle according to claim 2, wherein when the battery charging amount is in a maximum charging state, the controller is configured to operate the first propeller and the second propeller with the power of the battery.

10. The hybrid air mobility vehicle according to claim 2, wherein when the controller determines to save the battery, the controller is configured to control the engine to increase the power generated through the generator in proportion to a level of the battery charging amount such that the power generated by the engine through the generator increases as the battery charging amount decreases.

11. The hybrid air mobility vehicle according to claim 2, wherein when the flight mode is the cruising and the battery charging amount is equal to or larger than a set capacity, the controller is configured to operate the generator with the power of the battery and operate the clutch to couple the second propeller to the generator.

12. The hybrid air mobility vehicle according to claim 2, wherein when the flight mode is the cruising, the battery charging amount is equal to or larger than a set capacity, and the flight speed is equal to or higher than a predetermined driving speed, the controller is configured to operate the second propeller with the power of the battery and the power generated from the engine being engaged with the generator via the clutch.

13. The hybrid air mobility vehicle according to claim 2, wherein the controller is configured to:
determine whether to save the battery based on the battery charging amount,
operate the second propeller with the power generated from the engine being engaged with the generator via the clutch in case that the battery saving is desired.

14. The hybrid air mobility vehicle according to claim 2, wherein when the population density is equal to or higher than a reference population or the flight altitude is equal to or lower than a set altitude, the controller is configured to operate the clutch to mechanically connect the second propeller to the generator driven with the power of the battery so as to operate the second propeller.

15. The hybrid air mobility vehicle according to claim 2, wherein when the flight mode is the cruising, the battery charging amount is smaller than a set capacity, or in an emergency landing situation, the controller is configured to operate the second propeller by engaging the clutch and to charge the battery with a power generated by the generator.

16. The hybrid air mobility vehicle according to claim 2, wherein when the flight mode is the taxing, the controller is configured to operate the second propeller by engaging the clutch and driving the generator with a power of the battery.

17. The hybrid air mobility vehicle according to claim 2, wherein when the flight mode is the taxing and the battery charging amount is smaller than a set capacity, the controller is configured to operate the second propeller with a power by engine driving by driving the engine.

18. The hybrid air mobility vehicle according to claim 1, wherein a plurality of first propellers are provided on a wing of a flight body to generate a thrust in upward and downward directions during takeoff and landing of the flight body, and the second propeller is provided on a wing or at a tail of the flight body to generate a thrust rearward during flight of the flight body.

* * * * *